Feb. 15, 1955     R. KAISER     2,702,202
PACKED-SOCKET PIPE COUPLING WITH
RELEASABLE PIPE RETAINING MEANS
Filed June 23, 1950
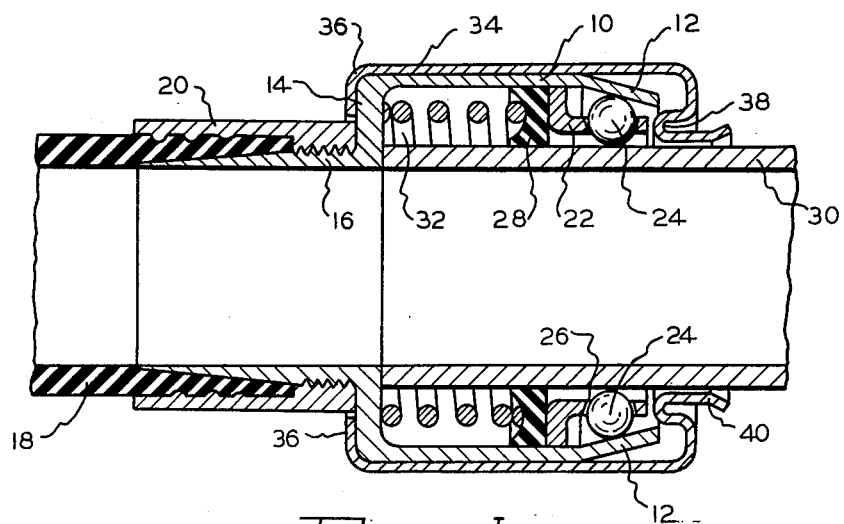
FIG. I
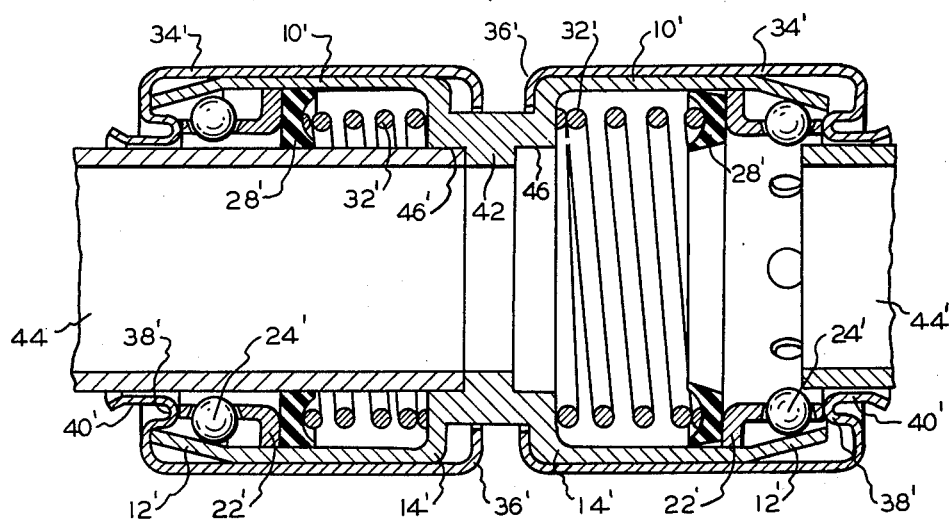
FIG. II
INVENTOR
RUDOLF KAISER
BY
ATTORNEY United States Patent Office 2,702,202
Patented Feb. 15, 1955

2,702,202

PACKED-SOCKET PIPE COUPLING WITH RELEASABLE PIPE RETAINING MEANS

Rudolf Kaiser, Ettlingen, Baden, Germany, assignor to Aeroquip Corporation, Jackson, Mich., a corporation of Michigan Application June 23, 1950, Serial No. 169,898

2 Claims. (Cl. 285—163)

The invention relates to a quick detachable pipe coupling adapted to connect an incompressible pipe end, for example, a metal pipe or an armored hose, to a conduit of any kind, for example, the end of another pipe or which may comprise two couplings for connecting two pipe ends. It is the object of the invention to provide a quick detachable pipe coupling, all the members of which are mounted on the conduit portion whereby the pipe end to be connected has not to be prepared for the connection in any manner, it rather can remain smooth. The pipe end can be connected firmly and tightly by mere insertion and can be withdrawn in a similar manner.

According to the invention, this result is obtained by providing a locking means acting in axial direction in a cylindrical sleeve mounted on the conduit portion, said locking means locking the pipe end to be inserted in axial direction in the cylindrical sleeve and by providing means accessible from the outside to release the locking means. Preferably, the locking means is constructed as a ball wedging mechanism having balls mounted in a race which are displaceable in radial direction, said race being displaceably mounted in the cylindrical sleeve, which is provided with a conically retracting mouthpiece, opposing the action of a spring. The necessary sealing is obtained in a simple manner by having the spring resting on an abutment flange of the cylindrical sleeve and by providing a packing ring between said spring and the ball race.

As means accessible from the outside to release the locking means, there is advantageously used a sleeve displaceably mounted on the cylindrical sleeve and being provided with means to prevent it from being removed, said sleeve having an inwardly bent rim which is adapted to be introduced into the mouthpiece. This device can be actuated without difficulties to withdraw the connected pipe end by a movement in opposite direction. Finally, it is recommended to secure the radially displaceable balls in the ball race by a suitable configuration of their seat holes in such a manner that they cannot drop out toward the interior.

Examples of the invention are shown in the drawing, in which:

Fig. I is a longitudinal section through a coupling according to the invention mounted on a hose, and Fig. II is a longitudinal section through a conduit portion with two couplings, according to the invention, mounted on the ends of said conduit portion, whereby the left member illustrates the decoupling position, while the right member shows the position in which the pipe end is to be introduced.

The quickly detachable pipe coupling according to Fig. I has a cylindrical sleeve 10, the right end of which being formed with a conically retracting mouthpiece 12. The sleeve 10 ends at the left side in an abutment flange 14 which is adjoined by a screw nipple 16. A hose 18 is attached to said screw nipple 16 in a known manner, whereby the hose 18 is firmly clamped between the screw nipple 16 and a hose filling 20 threaded on the screw nipple 16. An annular ball race 22 is mounted in the cylindrical sleeve 10 to be displaced in longitudinal direction, balls 24 being secured in said race in such a manner that they can freely move outwardly from their innermost position, but they cannot drop out toward the interior. This result is obtained by providing the seat openings 26 with cone-shaped rims surrounding the balls 24. A packing ring 28 abuts the ball race 22, said packing ring being guided exteriorally by the sleeve wall, the inner diameter of said packing ring being a little smaller than the outer diameter of the pipe 30 to be coupled. A compression spring 32 is mounted between the packing ring 28 and the abutment flange 14, said spring 32 constantly pressing the ball race 22 toward the right side so that its balls 24 engage the conical mouthpiece 12. Such action takes place even in the event that the balls 24, in the ball race, are moved to their innermost position whereby the diameter of the cross section of the passage defined by said balls is smaller than the outer diameter of the pipe 30.

A displaceable sleeve 34 is mounted on the cylindrical sleeve 10 and is prevented from being withdrawn by the provision of a bent rim 36 gripping over the abutment flange 14. The opposite end of the sleeve 34 has an inwardly bent rim 38, said rim being adapted to be introduced in the mouthpiece 12 when the sleeve 34 is displaced, whereby the rim 38 engages the ball race 22. To seal the coupling toward the exterior as tight as possible when the pipe 30 is introduced, the rim 38 is bent back to form a sleeve 40, the inner diameter of which is only slightly larger than the outer diameter of the pipe 30 so that said pipe can be introduced in the coupling along the sleeve 40 without friction, whereby the entering of contaminating matter is prevented to a great extent.

In the example of Fig. II, two couplings of the kind described are joined to a centrally located conduit portion 42. Each of said couplings has a cylindrical sleeve 10' with a mouthpiece 12' and an abutment flange 14', a ball race 22' with balls 24', a packing ring 28', a compression spring 32' and a sleeve 34' with a bent rim 36', inwardly bent rim 38' and sleeve 40' bent rearwardly. To guarantee a good centering action of the pipe 44 to be introduced, two recesses 46 are turned in the conduit portion 42, the inserted pipe ends being seated in said recesses.

The coupling operates in the following manner:

When the coupling is empty, the parts have the position shown on the right side of Fig. II. First, the pipe 44 to be introduced engages with its front edge the balls 24' and pushes back the ball race 22' together with the packing ring 28', while opposing the pressure of the spring 32', whereby the balls roll backward within the mouthpiece 12' and are simultaneously urged outwardly until they permit the pipe 44 to pass.

The pipe 44 can now be completely inserted in the coupling while the packing ring 28' is pressed outwardly until the pipe engages the abutment flange 14 according to Fig. I, or becomes seated in the recess 46 according to Fig. II. The compression spring 32' presses the packing ring 28' and ball race 22' outwardly, until the balls 24' become wedged between the mouthpiece 12' and the pipe 44. When the pipe 44 is subjected to tension the clamping action is increased. The pipe 44 to be connected and all parts of the coupling are shown in the coupling position in Fig. I.

As shown in the left side of Fig. II, the sleeve 34' with the cylindrical sleeve 10' is displaced toward the right side to disengage the pipe 44. During this step, the rim 38' enters the mouthpiece 12' and displaces toward the interior the ball race 22' together with the balls 24' as well as the packing ring 28' opposing the action of the spring 32'. As a result of this, the clamping action by the balls 24' is relieved and the pipe 44 can be withdrawn from the coupling. This disengaging operation can be carried out by simply moving the sleeve 34' in opposite direction with respect to the pipe 44.

Having thus described my invention what I claim and desire to protect by Letters Patent is:

1. A quick, detachable pipe coupling comprising a cylindrical sleeve in which a pipe end telescopes upon coupling, said sleeve having an axially extending conical portion at one end tapering inwardly towards the end of the sleeve into which said pipe end is inserted, a ball retainer ring element having an opening to receive the pipe end, said ring element being supported in said sleeve for axial movement relative thereto, wedge balls retained on said ring element but movable radially for wedging engagement or disengagement with respect to said conical portion, an annular sealing ring in said sleeve axially adjacent and abutting said ring element, said ring sealing the annular space between the interior wall of said sleeve and the exterior wall of the pipe end telescoping therein, a coil spring located in said sleeve and reacting against said sealing ring to move both the sealing ring and the ball retaining ring axially of said sleeve toward said conical portion said sealing ring being located between said spring and the inner end of said ball retaining ring, said wedge balls engaging said conical portion to contract the effective opening through said ball retaining ring element to less than the outer diameter of the pipe whereby upon insertion of the pipe end said ring element is moved axially by the pipe end until said balls clear said conical portion to enlarge the effective opening through said ring element sufficiently to pass the pipe end into position to be embraced by said seal, movement of the pipe end in the direction of the reaction of said spring against said ring element resulting in said wedge balls assuming a locking engagement between said conical portion and the exterior wall of the pipe end, and means for axially displacing said ring element in a direction away from said conical portion and against the action of said coil spring to release the pipe end for movement in an uncoupling direction, said means for axially displacing said ring element being in the form of a sleeve axially slidable upon the exterior of said cylindrical sleeve, said slidable sleeve having an end portion disposed to engage said ball retaining ring upon movement of said slidable sleeve in a direction to compressing said spring.

2. A quick action detachable pipe coupling comprising in combination, a cylindrical nipple having an outwardly extending radial flange and a cylindrical sleeve extending axially from the outer periphery of said flange in a direction away from said nipple, said sleeve terminating at one end, remote from said nipple and flange in a conical portion which tapers inwardly towards said remote end, a ball retainer ring element having an opening to receive the end of a pipe for insertion within said cylindrical sleeve, said ring element being supported in said sleeve for axial movement relatively thereto, wedge balls retained on said ring element but movable radially for wedging engagement or disengagement with respect to said conical portion, an annular sealing ring in said sleeve axially adjacent and abutting said ring element, said ring sealing an annular space defined between the interior wall of said sleeve and the exterior wall of the pipe end inserted therein, a coil spring located in said sleeve and reacting against said sealing ring to move both the sealing ring and the ball retaining ring axially of said sleeve toward said conical portion, said sealing ring being located between said spring and the inner end of said ball retaining ring element, said wedge balls engaging said conical portion to contract the effective opening through said ball retaining ring element to less than the outer diameter of the pipe, whereby upon insertion of the pipe end said ring element is moved axially by the pipe end until said balls clear said conical portion to enlarge the effective opening through said ring element sufficiently to pass the pipe end into position to be embraced by said seal, movement of the pipe end in the direction of the reaction of said spring against said ring element resulting in said wedge balls assuming a locking engagement between said conical portion and the exterior wall of said pipe end, and means for axially displacing said ring element in a direction away from said conical portion and against the action of said coil spring to release the pipe end for movement in an uncoupling direction, said means for displacing said ring element being in the form of a sleeve axially slidable upon the exterior surface of said cylindrical sleeve and having an inturned end flange for engageable with said nipple flange, said axially slidable sleeve having its opposite end formed to engage said ball retaining element upon movement of said slidable sleeve in a direction compressing said sleeve and removing said slidable sleeve flange from engagement with said nipple flange.

References Cited in the file of this patent

UNITED STATES PATENTS

| | | |
|---|---|---|
| Re. 19,910 | Parker | Mar. 31, 1936 |
| 1,337,288 | Stichler | Apr. 20, 1920 |
| 2,017,994 | Spang | Oct. 22, 1935 |
| 2,503,495 | Koester | Apr. 11, 1950 |

FOREIGN PATENTS

| | | |
|---|---|---|
| 126,418 | Australia | Dec. 22, 1947 |